United States Patent [19]

Bertram et al.

[11] Patent Number: 4,721,742

[45] Date of Patent: Jan. 26, 1988

[54] AMIDE MODIFIED EPOXY RESINS FROM A DIALKANOLAMINE, A MONOALKANOLAMINE, AN ANHYDRIDE AND (AN) UNSATURATED MONOMER(S)

[75] Inventors: James L. Bertram, Lake Jackson; Willie L. Myles, Sweeny, both of Tex.

[73] Assignee: The Dow Chemical Company, Midland, Mich.

[21] Appl. No.: 928,485

[22] Filed: Nov. 7, 1986

[51] Int. Cl.$^4$ .............................................. C08G 59/58
[52] U.S. Cl. ..................... 523/417; 528/111; 528/113; 528/110; 528/341; 528/102; 528/104; 528/297; 525/514
[58] Field of Search ............... 528/111, 113, 110, 341, 528/102, 104, 297; 525/514; 523/417

[56] References Cited

U.S. PATENT DOCUMENTS

| | | | |
|---|---|---|---|
| 2,848,433 | 8/1958 | Eirich | 528/365 |
| 3,960,795 | 6/1976 | Dowbenko et al. | |
| 4,088,708 | 5/1978 | Riew | 528/341 |
| 4,094,844 | 6/1978 | Allen et al. | |
| 4,098,744 | 7/1978 | Allen et al. | |
| 4,174,333 | 11/1979 | Hartman | 528/113 |
| 4,176,221 | 11/1979 | Shimp | 528/113 |
| 4,212,781 | 7/1980 | Evans et al. | |
| 4,292,195 | 9/1981 | Morris | 528/113 |
| 4,304,889 | 12/1981 | Waddill | 525/514 |
| 4,317,757 | 3/1982 | Kooijamans et al. | |
| 4,476,259 | 10/1984 | Kordomenos | 525/514 |
| 4,594,403 | 6/1986 | Kempter | 528/113 |
| 4,595,717 | 6/1986 | Patzchke | 523/417 |
| 4,619,952 | 10/1986 | Hart et al. | |

FOREIGN PATENT DOCUMENTS

| | | | |
|---|---|---|---|
| 218009 | 7/1956 | Australia | 528/113 |
| 6336 | 1/1976 | European Pat. Off. | |

*Primary Examiner*—Harold D. Anderson
*Assistant Examiner*—Frederick Krass

[57] ABSTRACT

Curable amide modified epoxy resins are prepared by polymerizing (I) the reaction product of (A) the reaction product of (1) an epoxy resin having an average of more than one 1,2-epoxy group per molecule and an average of from about 0 to about 30 aliphatic hydroxyl groups per molecule such as a diglycidyl ether of bisphenol A and (2) (a) a material having only one primary amine group per molecule such as monoethanolamine and (b) a material having only one secondary amine group per molecule such as diethanolamine wherein (a) and (b) are added sequentially with (a) being added first, or as a mixture with (B) an anhydride of an unsaturated dicarboxylic acid such as maleic anhydride with (II) a polymerizable ethylenically unsaturated monomer or mixture of monomers such as styrene and methacrylic acid. The resultant resin can be employed as is in the preparation of organic solvent borne coatings or it can be neutralized with a base so as to improve its stability in the preparation of aqueous coatings.

23 Claims, No Drawings

AMIDE MODIFIED EPOXY RESINS FROM A DIALKANOLAMINE, A MONOALKANOLAMINE, AN ANHYDRIDE AND (AN) UNSATURATED MONOMER(S)

BACKGROUND OF THE INVENTION

The present invention pertains to amide modified epoxy resins which are suitable in the preparation of coatings and the like.

The coatings industry is constantly seeking ways and means to eliminate or reduce the amount of organic solvents released into the atmosphere. Therefore, it is desirable to employ water dilutable resinous compositions in the preparation of such coatings. The present invention provides a resin which when neutralized with a base becomes water soluble or water disperable thereby resulting in stable solutions or dispersions.

SUMMARY OF THE INVENTION

One aspect of the present invention pertains to curable amide modified epoxy resins prepared from the reaction product of (A) the reaction product of (1) at least one epoxy resin having an average of more than one 1,2-epoxy group per molecule and an average of from about zero to about 30 aliphatic hydroxyl groups per molecule and (2) (a) at least one material having only one secondary amine group per molecule and (b) at least one material having only one primary amine group per molecule, wherein components (a) and (b) are added sequentially with component (a) being added first or components (a) and (b) are added as a mixture; with (B) at least one anhydride of a saturated or an ethylenically unsaturated dicarboxylic acid; and wherein the components are employed in quantities which provide (i) a ratio of moles of component (A-2-a) to epoxy equivalent contained in component (A-1) of from about 0.55:1 to about 0.95:1, preferably from about 0.75:1 to about 0.9:1; (ii) a ratio of moles of component (A-2-b) to epoxy equivalent contained in component (A-1) of from about 0.05:1 to about 0.45:1, preferably from about 0.1:1 to about 0.25:1; (iii) a ratio of the combined moles of components (A-2-a) and (A-2-b) per epoxy equivalent contained in component (A-1) is from about 0.9:1 to about 1.45:1, preferably from about 1:1 to about 1.1:1; and (iv) a ratio of moles of component (B) to moes of component (A-2-b) of from about 0.75:1 to about 1:1, preferably from about 0.9:1 to about 1:1.

Another aspect of the present invention pertains to curable amide modified epoxy resins prepared by polymerizing (I) the reaction product of (A) the reaction product of (1) an epoxy resin having an average of more than one 1,2-epoxy group per molecule and an average of from zero to about 30 aliphatic hydroxyl groups per molecule and (2) (a) a material having only one secondary amine group per molecule or water or phenol or a combination thereof and (b) a material having only one primary amine group per molecule; wherein the components (a) and (b) are added as a mixture or sequentially with component a being added first; with (B) an anhydride of an unsaturated dicarboxylic acid with (II) a polymerizable ethylenically unsaturated monomer; wherein (i) the ratio of moles component (I-A-2-a) to epoxy equivalent contained in component (I-A-1) is from about 0.5:1 to about 0.95:1, preferably from about 0.75:1 to about 0.9:1, (ii) the ratio of moles of component (I-A-2-b) to epoxy equivalent contained in component (I-a-1) is from about 0.05:1 to about 0.5:1, preferably from about 0.1:1 to about 0.25:1; (iii) the ratio of total moles of components (I-A-2-a), (I-A-2-b) and (I-B) to epoxy equivalent contained in component component (I-A-1) is from about 0.9:1 to about 1.5:1, preferably from about 1:1 to about 1.1:1; (iv) the ratio of moles of component (I-B) to moles of component (I-A-2-b) is from about 0.75:1 to about 1.25:1, preferably from about 0.9:1 to about 1.1:1; and (v) component (II) is present in quantities which provide from about 5 to about 75, preferably from about 10 to about 50, most preferably from about 15 to about 30 percent by weight based upon the combined weight of components I and II.

Another aspect of the present invention pertains to a water soluble or water dispersable product resulting from neutralizing the aforementioned amide modified epoxy resins with a base.

Another respect of the present invention pertains to coatings prepared from said amide modified epoxy resin and to coatings prepared from said neutralized amide modified epoxy resin.

DETAILED DESCRIPTION OF THE INVENTION

The reaction between the epoxy resin and the mixture of primary and secondary amines can be conveniently conducted at a temperature of from about 25° C. to about 200° C., preferably from about 60° C. to about 150° C. If desired, the reaction can be conducted in the presence of a suitable reaction medium such as, for example, aliphatic or aromatic hydrocarbons, ketones, glycol ethers, alcohols, ethers, esters, combinations thereof and the like. Particularly suitable solvents which can be employed as a reaction medium include, for example, methanol, ehtanol, isopropanol, butanol, cyclohexanol, 2-butoxyethanol, 2-methoxyethanol, 2-ethoxyethanol, 2-methoxypropanol, 2-butoxypropanol, toluene, xylene, cumene, tetrahydrofuran, dioxane, acetone, methylethyl ketone, methylisobutyl ketone, cyclohexanone, combinations thereof and the like.

The polymerization of the ethylenically unsaturated monomers with the unsaturated dicarboxylic acid anhydride reaction product is conveniently conducted in the presence of a free radical catalyst such as organic peroxides, azo compounds. combinations thereof and the like. Particularly suitable catalysts include, for example benzoyl peroxide, t-butylperbenzoate, ditert-butylperbenzoate, t-butylperoctoate, azobisisobutyronitrile, t-butylazo-2-cyano-4-methyl pentane, t-butylazo-4-cyanovaleric acid, t-butylazo-2-phenyl-4-methyl pentane, t-butylazo-2-phenyl propane, 1-cyano-1-(t-butylazo)-cyclohexane, 2-t-butylazo-1,1-diethoxycarbonyl-2,4-dimethyl pentane, combinations thereof and the like.

Suitable epoxy resins which can be employed herein include any epoxy resin having an average of more than one 1,2-epoxide group per molecule and an average of from about zero to about 30, preferably from about 4 to about 20 aliphatic hydroxyl groups per molecule. The higher aliphatic hydroxyl-containing epoxy resins can be conveniently prepared by reacting a relatively low equivalent weight epoxy resin having an average of more than one 1,2-epoxy group per molecule with a material having an average of more than one hydroxyl group per molecule. Particularly suitable epoxy resins include those prepared by reacting a diglycidyl ether of an aromatic dihydroxyl-containing compound with an aromatic dihydroxyl-containing compound. Most suitable aromatic dihydroxyl-containing compounds include those represented by the formulas

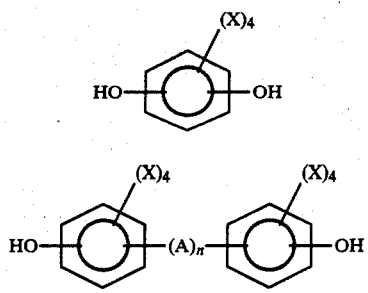

wherein A is a divalent hydrocarbyl group having from 1 to about 12, preferably from 1 to about 6, carbon atoms, —O—, —S—, —S—S—,

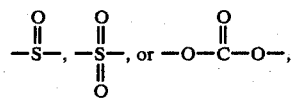

each X is independently hydrogen, a hydrocarbyl or hydrocarbyloxy group having from 1 to about 10, preferably from 1 to about 4, carbon atoms, a halogen atom, preferably chlorine or bromine and n has a value of zero or 1. Most suitable such dihydroxyl-containing compounds include, for example, bisphenol A, bisphenol F, resorcinol, catechol, hydroquinone, halogenated or alkyl or alkoxy substituted derivatives of such dihydroxyl-containing compounds, combinations thereof and the like. These dihydroxyl-containing compounds can be the same or different from those from which the epoxy resin was prepared. Said epoxy resins can be prepared by dehydrohalogenating the reaction product of a dihydroxyl-containing compound with an epihalohydrin such as epichlorohydrin, epibromohydrin, epiiodohydrin as well as alkylated derivatives thereof such as, for example, methylepichlorohydrin, methyl epibromohydrin, methylepiiodohydrin, combinations thereof and the like.

Suitable primary amines which can be employed herein include, for example those represented by the formula X-R-NH$_2$ wherein R is a divalent hydrocarbyl or hydrocarbyloxy group having from about 2 to about 9 carbon atoms and X is hydrogen, hydroxyl, nitro or the like.

Particularly suitable primary amines which can be employed herein include, for example, ethylamine, propylamine, butylamine, aniline, benzylamine, ethanolamine, methoxyethylamine, methoxypropylamine, ethoxyethylamine, ethoxypropylamine, ethoxybutylamine, butoxyethylamine, butoxypropylamine, butoxybutylamine, nitrobenzylamine, combinations thereof and the like.

The term hydrocarbyl as employed herein means any aliphatic, cylcoaliphatic, aromatic, aryl substituted aliphatic or aliphatic substituted aromatic groups.

Suitable secondary amines which can be employed herein include, for example, those represented by the formula

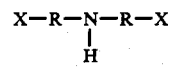

wherein each X and R are independently as defined above.

Particularly suitable secondary amines which can be employed herein include, for example, diethylamine, dipropylamine, dibutylamine, diethanolamine, methylethanolamine, ethylethanolamine, bis(methoxyethyl)amine, bis(ethoxyethyl)amine, bis(methoxypropyl)amine, bis(butoxyethyl)amine, bis(butoxypropyl)amine, bis(butoxybutyl)amine, combinations thereof and the like.

Suitable phenols include besides phenol, those substituted with hydrocarbyl groups having from 'to about 10 carbon atoms, halogen atoms, particularly chlorine or bromine, and the like. Particularly suitable phenols include, for example, phenol, o-cresol, nonylphenol, chlorophenol, dichlorophenol, trichlorophenol, bromophenol, dibromophenol, tribromophenol, butylphenol, combinations thereof and the like.

Suitable ethylenically unsaturated dicarboxylic acid anhydrides which can be employed herein include, for example, maleic anhydride, tetrahydrophthalic anhydride, methyltetrahydrophthalic anhydride, citraconic anhydride, itaconic anhydride, dodecenylsuccinic anhydride, maleic anhydride adducts of linoleic acid, cyclopentadiene or methylcyclopentadiene, combinations thereof and the like.

The carboxylic acid anhydride is added to the modified epoxy resin at a temperature of not greater than about 100° C., preferably not greater than about 75° C. At temperatures greater than about 100° C., too much of the anhydride undesirably reacts with the aliphatic hydroxyl groups instead of the secondary amine groups resulting from the reaction between the epoxy resin and the primary amine compounds.

Suitable polymerizable ethylenically unsaturated compounds which can be employed herein include, for example, styrene, alpha-methylstyrene, halogenated styrene, butadiene, alkyl or hydroxyalkyl acrylates, alkyl or hydroxyalkyl methacrylates, acrylic acid, methacrylic acid, acrylonitrile, methacrylonitrile, vinyl chloride, vinylidine chloride, vinyl acetate, methyl acrylate, ethyl acrylate, butyl acrylate, 2-ethylhexyl acrylate, isoprene isobutylene, chloroprene, hydroxypropyl acrylate, hydroxyethyl acrylate, hydropropyl methacrylate, hydroxyethyl methacrylate, acrylamide, maleic acid, fumaric acid, itaconic acid, citaconic acid, mesaconic acid, combinations thereof and the like.

Suitable bases which can be employed to neutralize the amide modified epoxy resins of the present invention include, for example, amines, alkali metal and alkaline earth metal hydroxides. Particularly suitable bases include, sodium hydroxide, potassium hydroxide, lithium hydroxide, calcium hydroxide, barium hydroxide, magnesium hydroxide, ammonia, butylamine, dibutylamine, triethylamine, tributylamine, dimethylethanolamine, methyldiethanolamine, N-methylmorpholine, combinations thereof and the like.

Suitable curing agents which can be employed in the coating compositions with the amide modified epoxy resins include, for example, melamine-aldehyde resins, alkylated melamine-aldehyde resins, urea-aldehyde resins, alkylated urea-aldehyde resins, phenol-aldehyde resins, alkylated phenol-aldehyde resins, blocked isocyanates, combinations thereof and the like. Particularly suitable curing agents include, for example, hexamethoxymethylmelamine, commercially available as CYMEL 303 from American Cyanamide Co., BEETLE 65, a methylated urea-formaldehyde resin commercially available from American Cyanamide Co., VARCUM 1131, a phenolic-type resin, commercially available from Reichhold Chemicals, Inc., combinations thereof and the like.

If desired, catalyst promoters or accelerators can be employed. Suitable such promoters or accelerators include, for example, mineral and organic acids, combinations thereof and the like. Particularly suitable such accelerators or promoters include, for example, phosphoric acid, polyphosphoric acid, organic sulfonic acids such as, for example, benzene sulfonic acid, toluene sulfonic acid, combinations thereof and the like.

Suitable solvents which can be employed to prepare solvent borne coatings from the compositions of the present invention include those solvents mentioned above as a reaction medium.

Various additives such as, for example, pigments, dyes, flow control agents, fillers and the like can be added to the coating compositions if desired.

The following examples are illustrative of the invention but are not to be construed as to limiting the scope thereof in any manner.

EXAMPLE 1

To a four-neck one liter reaction vessel equipped with a means for nitrogen purging, temperature control, stirring, condensing and reactant addition were added 100 parts by weight, pbw, (0.056 equiv.) of a diglycidyl ether of bisphenol A having an average epoxide equivalent weight of 1800 and 34 pbw of 2-butoxy ethanol. The contents were heated to a temperature of 120° C. and 4.91 pbw (0.047 mole) of diethanolamine was added and the reaction maintained at a temperature of 120° C. for 30 minutes (1,800 s). Then 0.51 pbw (0.0084 mole) of monoethanolamine was added and the reaction continued at 120° C. for 30 minutes (1,800 s). The temperature was then cooled to 75° C. and 0.81 pbw (0.0083 mole) of maleic anhydride was added. The temperature was maintained at 75° C. for 30 minutes (1,800 s). The temperature was adjusted to 100° C. and a mixture containing 19.39 pbw (0.19 mole) of styrene, 17.07 pbw (0.20 mole) of methacrylic acid and 0.36 pbw of azobisisobutyronitrile was slowly added over a period of 1 hour (3,600 s). After adding a mixture of 0.08 pbw of azobisisobutryonitrile and 11.6 pbw of n-butanol, the polymerization was continued at 100° C. for 30 minutes (1,800 s). The temperature was adjusted to 75° C. and a mixture of 14.58 pbw (0.16 mole) of diethanol amine and 375 pbw of deionized water was added over a period of 1 hour (3,600 s) to neutralize the acid groups contained in the reaction product. The reaction was conducted at 75° C. for 30 minutes (1,800 s). The resultant product had a non-volatiles content of 21.2% by weight and a Brookfield viscosity of 2800 cps (2.8 Pa.s) at 25° C. and a pH of 8.6.

EXAMPLE 2

A coating was prepared by blending 38 pbw of the amide modified epoxy resin prepared in example 1 at 21% by weight non-volatiles, 0.9 pbw of hexamethoxymethylmelamine (commercially available from American Cyanamid as Cymel 303) and 0.44 pbw of p-toluene sulfonic acid as a catalyst promoter.

This coating was applied to unpolished cold rolled steel panels via a No. 6 Meyer wound wire rod to provide a coating thickness of 0.4 mil (0.1016 mm). The coated panels were baked in an oven at 310° F. (154.4° C.) for 10 minutes (600 s). The following tests were performed on the resultant coated panels.

MEK RESISTANCE—A two pound ball pien hammer with the ball end covered with eight layers of cheese cloth was saturated with methyl ethyl ketone (MEK) and rubbed across the baked panels. One back and forth cycle across the panel was considered as being 1 MEK double rub. One hundred double rubs were considered a pass.

ACID RESISTANCE—Glacial acetic acid, 1 ml, was placed on the coating and a timer started. When the coating delaminates from the substrate, failure has occurred and the timer is stopped. This time is recorded and referred to as time to failure for glacial acetic acid.

BOILING WATER RESISTANCE—A coated panel was immersed in boiling water for 60 minutes (3,600 s). The panel was then removed and cut through with an eleven blade cross hatch knife with 1.5 mm spacing. A strip of cellophane tape was applied to the scratched surface and the tape was then pulled off. No loss of adhesion was noted as a pass.

IMPACT RESISTANCE—The coated panel was impacted with a falling weight from a calibrated height to give an impact up to 180 in.-lb (20.34 J). An HCl-CuSO$_4$-water solution was applied to the impact spot for 5 minutes to check for failure.

FLEXIBILITY—A coated panel was bent from 0 to ⅛ in. (3.175 mm) using a wedge mandrel attachment with a Gardner impacter. The bent panel was checked for failure with the HCl-CuSO$_4$-water solution. Any failure was noted and recorded as percent failure from the smaller end. One inch (35.4 mm) of failure or less was considered a pass.

PENCIL HARDNESS—This was determined by the procedure defined in Paint Testing Manual by H. A. Gardner and G. G. Sward in the 12th Ed. (1962), pp 131–132. When the coating is broken to the metal surface, that constitutes a failure. The results reported here are a pencil hardness that does not break the film, but the next pencil grade does break the film.

The results are given in the following table.

| FILM PROPERTIES | RESULTS |
| --- | --- |
| MEK double rubs | Pass |
| Reverse Impact, in-lbs/J | No Failure, (>180/20.34) |
| Boiling Water Resistance. 60 min (3600 s) | Pass |
| Chemical Resistance, min./sec. | 25/1500 |
| Pencil Hardness | 4H |
| Film Thickness, mils/mm | 0.4/0.01016 |

We claim:

1. A curable amide modified epoxy resin prepared by reacting the reaction product of (A) the reaction product of (1) at least one epoxy resin having an average of more than one 1,2-epoxy group per molecule and an average of from about zero to about 30 aliphatic hydroxyl groups per molecule and (2) (a) at least one dialkanolamine and (b) at least one monoalkanolamine, wherein components (a) and (b) are added as a mixture or sequentially with component (a) being added first; with (B) at least one anhydride of a saturated or an ethylenically unsaturated dicarboxylic acid; and wherein the components are employed in quantities which provide (i) a ratio of moles of component (A-2-a) to epoxy equivalent contained in component (A-1) of from about 0.55:1 to about 0.95:1; (ii) a ratio of moles of component (A-2-b) to epoxy equivalent contained in component (A-1) of from about 0.05:1 to about 0.45:1; (iii) a ratio of total moles of components (A-2-a) and (A-2-b) per epoxy equivalent in component (A-1) of from about 0.9:1 to about 1.45:1; and (iv) a ratio of moles of component (B) to moles of component (A-2-b) of from about 0.75:1 to about 1:1.

2. A curaable amide modified epoxy resin of claim 1 wherein
   (i) the ratio of moles component (I-A-2-a) to epoxy equivalent contained in component (A-1) is from about 0.75:1 to about 0.9:1;
   (ii) the ratio of moles component (A-2-b) to epoxy equivalent contained in component (A-1) is from about 0.1:1 to about 0.25:1;
   (iii) the ratio of combined moles of components (A-2-a) and (A-2-b) to epoxy equivalent contained in component (A-1) is from about 1:1 to about 1.1:1;
   (iv) the ratio moles of component (B) to moles of component (A-2-b) is from about 0.9:1 to about 1:1 and
   (v) components (A-2-a) and (A-2-b) are added sequentially to component (A-1) with component (A-2-a) being added first.

3. A curable amide modified epoxy resin of claim 1 wherein
   (i) component (A-1) is a diglycidyl ether of bisphenol A or a halogenated or alkyl ring substituted derivative thereof; and
   (ii) component (B) is an unsaturated dicarboxylic acid anhydride.

4. A curable amide modified epoxy resin of claim 3 wherein
   (i) component (A-1) has an average of from about 4 to about 20 aliphatic hydroxyl groups per molecule;
   (ii) component (A-2-a) is diethanolamine;
   (iii) component (A-2-b) is monoethanolamine; and
   (iv) component (B) is maleic anhydride.

5. A curable amide modified epoxy resin of claim 2 wherein
   (i) component (A-1) is a diglycidyl ether of bisphenol A or a halogenated or alkyl ring substituted derivative thereof;
   (ii) component (A-2-b) is a monoalkanolamine;
   (iii) component (A-2-a) is a dialkanolamine; and
   (iv) component (I-B) is an unsaturated dicarboxylic acid anhydride.

6. A curable amide modified epoxy resin of claim 5 wherein
   (i) component (A-1) has an average of from about 4 to about 20 aliphatic hydroxyl groups per molecule;
   (ii) component (I-A-2-a) is diethanol amine;
   (iii) component (I-A-2-b) is monoethanolamine; and
   (iv) component (I-B) is maleic anhydride.

7. A curable amide modified epoxy resin prepared by polymerizing (I) the reaction product of (A) the reaction product of (1) an epoxy resin having an average of more than one 1,2-epoxy group per molecule and (2) (a) a dialkanolamine and (b) a monoalkanolamine; wherein components (a) and (b) are added as a mixture or sequentially with component (a) being added first; with (B) an anhydride of an unsaturated dicarboxylic acid; with (II) a polymerizable ethylenically unsaturated monomer or mixture of monomers; wherein (i) the ratio of moles of component (I-A-2-a) to epoxy equivalent contained in in component (I-A-1) is from about 0.5:1 to about 0.95:1;
(ii) the ratio of moles of component (I-A-2-b) to epoxy equivalent contained in in component (I-A-1) is from about 0.05:1 to about 0.5:1;
(iii) the ratio of total moles of components (I-A-2-a) and (I-A-2-b) per epoxy equivalent contained in in component (I-A-1) is from about 0.9:1 to about 1.5:1;
(iv) the ratio of moles of component (I-B) to moles of component (I-A-2-b) is from about 0.75:1 to about 1.25:1); and
(v) component (II) is present in a quantity which provides from about 5 to about 75 percent by weight of component (II) based upon the combined weight of components (I) and (II).

8. A curable amide modified epoxy resin of claim 7 wherein
   (i) the ratio of moles component (I-A-2-a) to epoxy equivalent contained in component (I-A-1) is from about 0.75:1 to about 0.9:1;
   (ii) the ratio of moles component (I-A-2-b) to epoxy equivalent contained in component (I-A-1) is from about 0.1:1 to about 0.25:1;
   (iii) the ratio of combined moles of components (I-A-2-a) and (I-A-2-b) per epoxy equivalent contained in component (I-A-1) is from about 1:1 to about 1.1:1;
   (iv) the ratio moles of component (I-B) to epoxy equivalent contained in component (I-A-1) is from about 0.9:1 to about 1.1:1; and
   (v) component (II) is present in a quantity which provides from about 10 to about 50 percent by weight of component (II) based upon the combined weight of components (I) and (II); and
   (vi) components (I-A-2-a) and (I-A-2-b) are added sequentially to component (I-A-1) component (I-A-2-a) being added first.

9. A curable amide modified epoxy resin of claim 7 wherein
   (i) component (I-A-1) is a diglycidyl ether of bisphenol A or a halogenated or alkyl ring substituted derivative thereof;
   (ii) component (I-A-2-a) is a dialkanolamine;
   (iii) component (I-A-2-b) is a monolkanolamine; and
   (iv) component (II) is a vinyl substuted aromatic compound, alkyl ester or hydroxyl or hydroxyalkyl ester of acrylic or methacrylic acid, acrylic acid or methacrylic acid or a combination thereof and is present in a quantity which provides from about 15 to about 30 percent by weight component (II) based upon the combined weight of components (I) and (II).

10. A curable amide modified epoxy resin of claim 9 wherein
    (i) component (A-1) has an average of from about 4 to about 20 aliphatic hydroxyl groups per molecule;
    (ii) component (I-A-2-a) is diethanol amine;
    (iii) component (I-A-2-b) is monoethanolamine;
    (iv) component (I-B) is maleic anhydride; and
    (v) component (II) is a mixture of styrene, at least one of acrylic or methacrylic acid and at least one of hydroxyethyl acrylate, hydropropyl acrylate, hydroxyethylmethacrylate or hydroxypropyl methacrylate.

11. A curable amide modified epoxy resin of claim 8 wherein (i) component (I-A-1) is a diglycidyl ether of bisphenol A or a halogenated or alkyl ring substituted derivative thereof;
(ii) component (I-A-2-a) is a dialkanolamine;
(iii) component (I-A-2-b) is a monoalkanolamine;
(iv) component (II) is a vinyl substuted aromatic compound, alkyl ester of acrylic or methacrylic acid, acrylic acid or methacrylic acid or a combination thereof.

12. A curable amide modified epoxy resin of claim 11 wherein
(i) component (A-1) has an average of from about 4 to about 20 aliphatic hydroxyl groups per molecule;
(ii) component (I-A-2-a) is diethanol amine;
(iii) component (I-A-2-b) is monoethanolamine;
(iv) component (I-B) is maleic anhydride; and
(v) component (II) is a mixture of styrene, at least one of acrylic or methacrylic acid and at least one of hydroxyethyl acrylate, hydroxypropyl acrylate, hydroxyethyl methacrylate or hydroxypropyl methacrylate.

13. A composition resulting from neutralizing a curable amide modified epoxy resin of claims 1, 2, 3, 4, 5, 6, 7, 8, 9, 10, 11 or 12 with a base.

14. A composition of claim 13 wherein said base is an amine or a hydroxide of an alkali metal or an alkaline earth metal.

15. A composition of claim 14 wherein said base is dimethylethanolamine or sodium hydroxide.

16. A coating composition comprising an amide modified epoxy resin of claims 1, 2, 3, 4, 5, 6, 7, 8, 9, 10, 11 or 12 and a curing agent therefor.

17. A coating compositon of claim 16 wherein said curing agent is hexamethoxymethylmelamine.

18. A coating composition comprising an amide modified epoxy resin of claim 13 and a curing agent therefor.

19. A coating composition of claim 18 wherein said curing agent is hexamethoxymethylmelamine.

20. A coating composition comprising an amide modified epoxy resin of claim 14 and a curing agent therefor.

21. A coating composition of claim 20 wherein said curing agent is hexamethoxymethylmelamine.

22. A coating composition comprising an amide modified epoxy resin of claim 15 and a curing agent therefor.

23. A coating compositon of claim 22 wherein said curing agent is hexamethoxymethylmelamine.

* * * * *

UNITED STATES PATENT AND TRADEMARK OFFICE
CERTIFICATE OF CORRECTION

PATENT NO. : 4,721,742

DATED : January 26, 1988

INVENTOR(S) : James L. Bertram and Willie L. Myles

It is certified that error appears in the above-identified patent and that said Letters Patent is hereby corrected as shown below:

1st page, under ABSTRACT, line 4; change "group" to --groups--.

1st page, under ABSTRACT, line 11; delete the comma "," after "first".

1st page, under ABSTRACT, lines 14-15; delete "or mixture of monomers".

1st page, under ABSTRACT, line 15; insert --a mixture of-- before "styrene".

Col. 1, line 17; change "disperable" to --dispersable--.

Col. 1, line 46; change "moes" to --moles--.

Col. 1, line 68; change "(I-a-1)" to --(I-A-1)--.

Col. 2, line 1; insert a space between "0.1:1" and "to".

Col. 2, line 3; delete 2nd occurrence of "component".

Col. 2, line 17; change "respect" to --aspect--.

Col. 2, line 34; change "ehtanol" to --ethanol--.

Col. 3, line 64; change "cylcoaliphatic" to --cycloaliphatic--.

Col. 4, line 17; change "to" to --1 to--.

Col. 4, line 48; insert a comma --,-- after "isoprene".

UNITED STATES PATENT AND TRADEMARK OFFICE
CERTIFICATE OF CORRECTION

PATENT NO. : 4,721,742

DATED : January 26, 1988

INVENTOR(S) : James L. Bertram and Willie L. Myles

PAGE 2 OF 3

It is certified that error appears in the above-identified patent and that said Letters Patent is hereby corrected as shown below:

Col. 4, line 51; change "citaconic" to --citraconic--.

Col. 6, line 6; change "perfomed" to --performed--.

Col. 7, line 12; change "curaable" to --curable--.

Col. 7, line 48; change "(A-2-b)" to --(A-2-a)--.

Col. 7, line 49; change "(A-2-a)" to --(A-2-b)--.

Col. 7, line 66; change 2nd occurrence of "an" to --the--.

Col. 8, line 2; delete the 2nd occurrence of "in".

Col. 8, line 5; delete the 2nd occurrence of "in".

Col. 8, line 8; delete the 2nd occurrence of "in".

Col. 8, line 13; change "1.25:1)" to --1.25:1--.

Col. 8, line 38; insert --with-- after "(I-A-1)".

Col. 8, line 46; change "monolkanolamine" to --monoalkanolamine--.

Col. 8, line 47; change "substuted" to --substituted--.

UNITED STATES PATENT AND TRADEMARK OFFICE
CERTIFICATE OF CORRECTION

PATENT NO. : 4,721,742

DATED : January 26, 1988

INVENTOR(S) : James L. Bertram and Willie L. Myles

It is certified that error appears in the above-identified patent and that said Letters Patent is hereby corrected as shown below:

Col. 8, line 64; change "hydropropyl" to --hydroxypropyl--.

Col. 9, line 8; change "substuted" to --substituted--.

Col. 10, line 12; change "compositon" to --composition--.

Col. 10, line 24; change "compositon" to --composition--.

Signed and Sealed this

Fourth Day of October, 1988

Attest:

DONALD J. QUIGG

Attesting Officer

Commissioner of Patents and Trademarks